United States Patent [19]
Young et al.

[11] Patent Number: 5,338,081
[45] Date of Patent: Aug. 16, 1994

[54] REMOVABLE FLOOR-MOUNTED CONSOLE

[75] Inventors: Nathan W. Young; Russell P. Shafer, Jr., both of Holland, Mich.

[73] Assignee: Prince Corporation, Holland, Mich.

[21] Appl. No.: 99,178

[22] Filed: Jul. 29, 1993

[51] Int. Cl.⁵ .............................................. B60R 7/04
[52] U.S. Cl. .............................. 296/37.14; 296/37.8; 224/42.42; 297/192; 248/503
[58] Field of Search .......................... 296/37.14, 37.8; 224/273, 275, 42.42, 42.45 R; 297/192; 248/503, 503.1

[56] References Cited

U.S. PATENT DOCUMENTS

| | | |
|---|---|---|
| 2,337,505 | 12/1943 | Swift . |
| 3,058,769 | 10/1962 | Willson ............................ 296/23 |
| 3,623,683 | 11/1971 | Bennett ...................... 297/192 X |
| 3,827,772 | 8/1974 | Johnson .................... 296/37.8 X |
| 3,870,210 | 3/1975 | Trammell, Jr. ................. 224/42.45 |
| 4,061,395 | 12/1977 | Boole ............................ 297/192 |
| 4,236,749 | 12/1980 | Schluns ........................ 296/156 |
| 4,512,503 | 4/1985 | Gioso ......................... 224/42.42 |
| 4,759,580 | 7/1988 | Berklich, Jr. et al. ........ 248/503.1 X |
| 4,796,791 | 1/1989 | Goss et al. .................... 224/275 |
| 4,925,245 | 5/1990 | Pendleton et al. ............. 297/192 X |
| 4,942,990 | 7/1990 | White ......................... 224/42.42 |
| 5,085,481 | 2/1992 | Fluharty et al. ................ 296/37.8 |
| 5,106,143 | 4/1992 | Soeters ......................... 296/37.8 |
| 5,125,711 | 6/1992 | Syed et al. .................. 248/503.1 X |
| 5,205,452 | 4/1993 | Mankey ........................ 224/275 |

FOREIGN PATENT DOCUMENTS 4063739  2/1993  Japan ............................ 296/37.8

Primary Examiner—Joseph D. Pape
Attorney, Agent, or Firm—Price, Heneveld, Cooper, DeWitt & Litton

[57] ABSTRACT

A removable floor-mounted console includes a frame having a base with a seat mounting mechanism attached thereto for removably mounting the base and frame to the vehicle in an area where a seat has been removed. The console frame includes a storage area which, in one embodiment, includes a slide-out storage bin. The frame may also include, in an upper portion thereof, integrally formed container holders and storage trays. Further, in one embodiment of the present invention, the console includes an electronic entertainment device such as a small screen LCD television for use by the rear seat occupants of the vehicle.

21 Claims, 2 Drawing Sheets

REMOVABLE FLOOR-MOUNTED CONSOLE

BACKGROUND OF THE INVENTION

The present invention relates to a vehicle console and particularly one which can be removably mounted to the seat mounting mechanism of a vehicle having removable seats.

Many modern vehicles, and particularly the so-called mini-vans, have removable bucket seats for changing the seating arrangements and storage areas of the vehicle. Typically, vehicle seats are mounted on U-shaped mounting rods fixedly secured to recesses in the floor of the vehicle by mounting sockets associated with the seats and having spring-loaded latching mechanisms for anchoring the seats in place. The vehicle seats can be easily removed by depressing a latching lever and lifting the seats from the mounting brackets in the floorboard of the vehicle. In many mini-vans and vans, several such seats are mounted to the vehicle particularly in the second and third rows of seats. Typically, vehicle consoles for storage of articles and the like are permanently mounted between the seats of the vehicle or, in some cases, are included in fixed armrests. Some consoles have been suggested which are portable and can be attached to the vehicle seats themselves. Consoles may include accessories such as cupholders and storage bins, although existent consoles provide the vehicle occupants with minimal storage and usefulness due in part to the restricted space between vehicle seats.

SUMMARY OF THE INVENTION

The removable floor-mounted console of the present invention, however, capitalizes on the availability of the relatively large space with floor-mounted anchors to which the console can be removably attached when a seat has been removed. For such purpose, the removable floor-mounted console of the present invention includes a frame having a base with a seat mounting mechanism attached thereto for removably mounting the base and frame to the vehicle in an area where a seat has been removed. Typically, the seat mounting structure is a four point connection to the vehicle floor and provides a relatively wide base from which to provide a frame for including a variety of console accessories. In a preferred embodiment of the invention, the console frame includes a storage area which, in one embodiment, includes a slide-out storage bin. The frame may also include, in an upper portion thereof, integrally formed container holders and storage trays. Further, in one embodiment of the present invention, the console includes an electronic entertainment device such as a small screen LCD television for use by the rear seat occupants of the vehicle.

Thus, by providing a removable floor-mounted console, the console can be of significant size to improve the storage capability and usefulness of the console and be selectively used as desired for particular journeys in the vehicle. These and other features, objects and advantages of the present invention will become apparent upon reading the following description thereof, together with reference to the accompanying drawings in which:

DETAILED DESCRIPTION OF THE PREFERRED EMBODIMENT

Referring now to the Figures, there is shown a removable floor-mounted console 10 embodying the present invention which is mounted to the floor 12 (FIGS. 3 and 4) of a vehicle such as a mini-van, van or the like which includes removable seats. The vehicle floor 12 for such purpose includes a plurality of spaced rod-shaped mounting brackets 14 mounted in recessed areas 15 in the vehicle floor. The brackets 14 typically are located at four spaced-apart locations for receiving removable seats which include mating brackets which removably and lockably attach the seats to the floor 12 of the vehicle. The same design of mounting mechanism used for attaching a removable seat to the vehicle is employed for removably mounting the console 10 to the vehicle floor.

Figure 1:
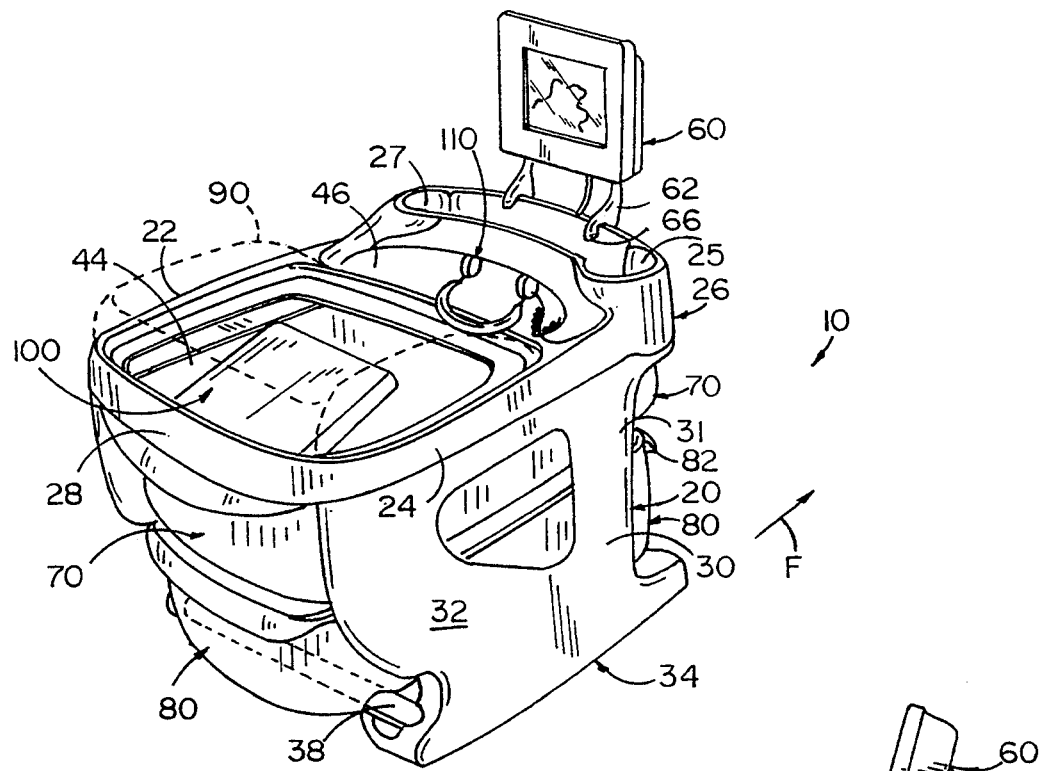
FIG. 1 is a perspective view of a removable floor-mounted console embodying the present invention.
Figure 3:
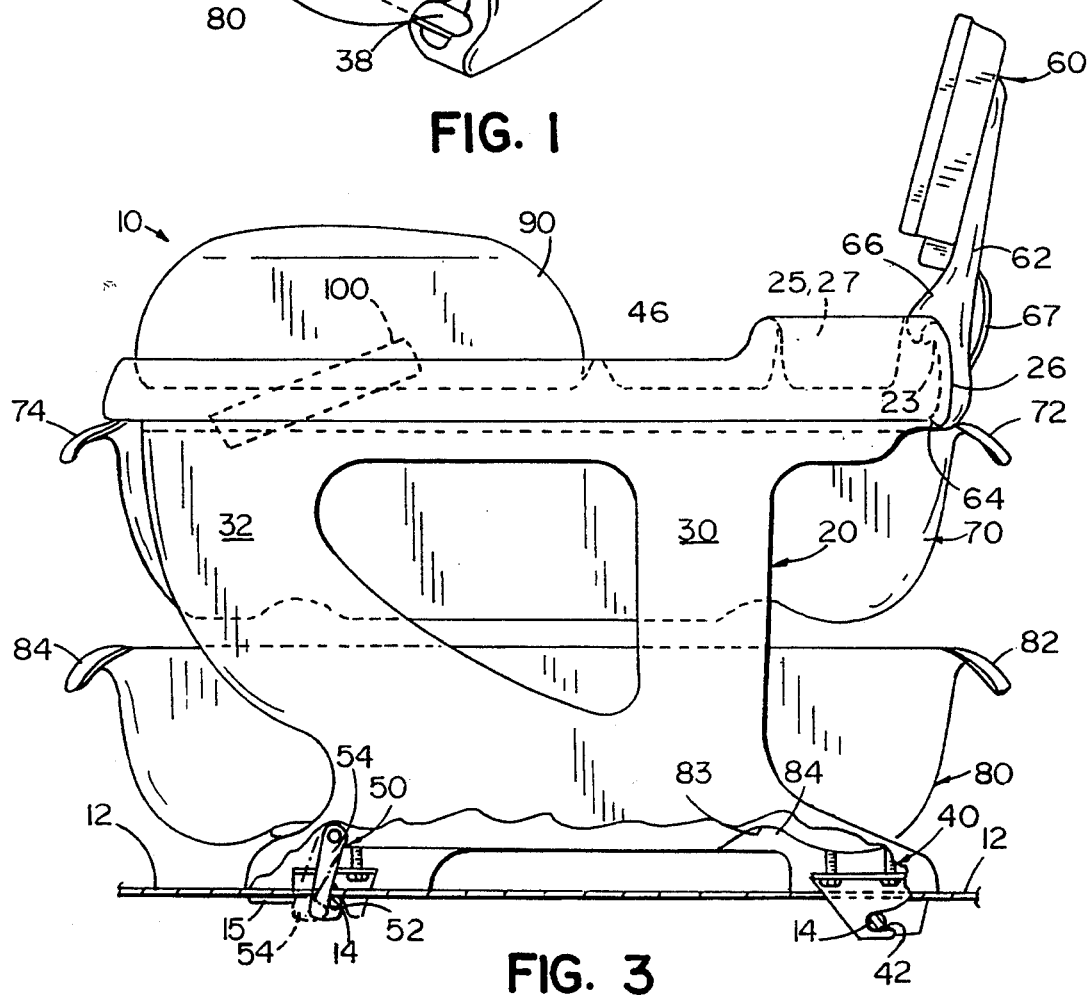
FIG. 3 is an enlarged right side elevational view of the console embodying the present invention.
Figure 2:
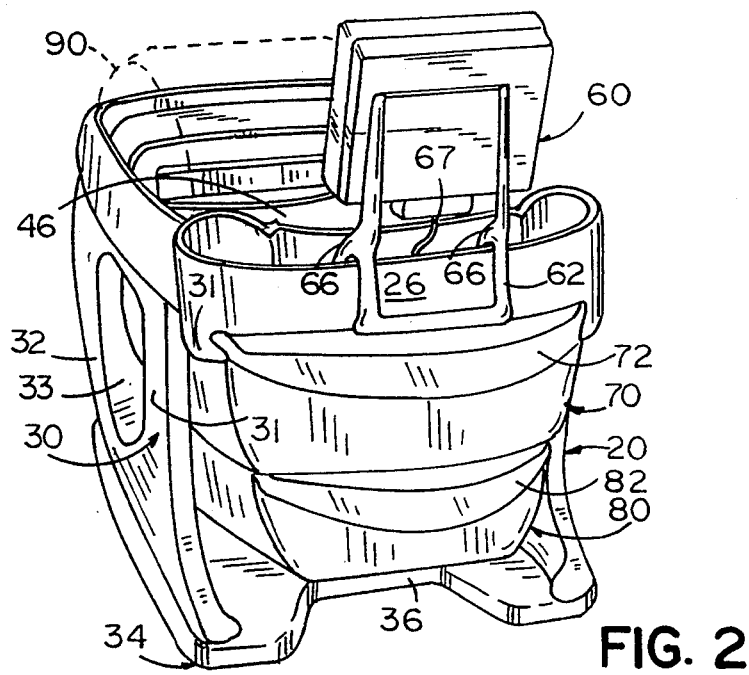
FIG. 2 is a rear perspective view of the console shown in FIG. 1.
Figure 4:
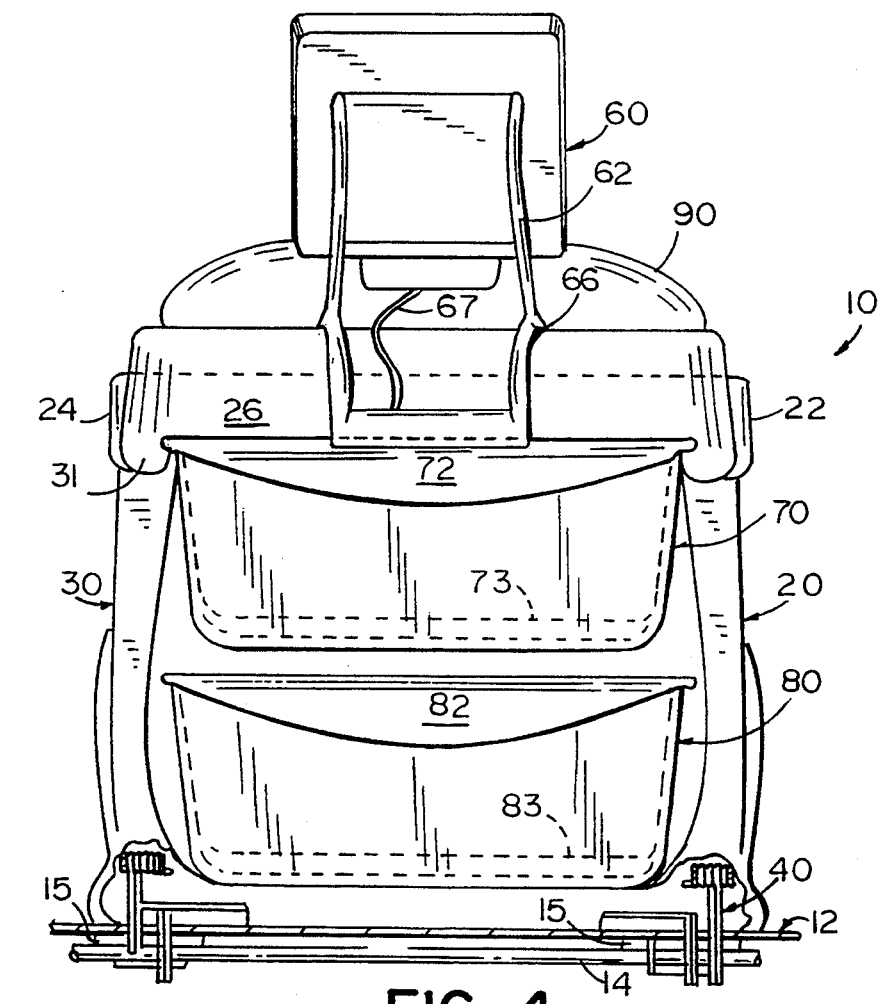
FIG. 4 is a rear elevational view of the console shown in FIG. 3.

Console 10 includes a frame 20 comprising an upper rim having sides 22 and 24, a forward leg 26 and a rear edge 28. When mounted to the vehicle, the forward end of the console points toward the front of the vehicle as indicated by arrow F in FIG. 1. Extending downwardly from the upper rim are a pair of spaced forward legs 30 and a pair of forwardly and downwardly inclined rear legs 32. The legs communicate with a generally rectangular base platform 34 including a forward cross member 36 and rear cross member 38 to which seat mounting brackets 40 and 50 (FIGS. 3 and 4) are attached. Brackets 40 are a pair of spaced vertical plates with generally C-shaped forwardly facing openings 42, as best seen in FIG. 3, for engaging the forward floor-mounted mounting rods 14 of the vehicle. Similarly, the base 34 includes a pair of rear mounting brackets 50 which are plates which include an upwardly extending generally V-shaped notch 52 for extending over mounting rod 14.

A pivoted locking lever 54 is suitably mounted to base 34 for locking the console to the vehicle floor for allowing the base to be removably mounted to the vehicle floor. The console is installed by first inserting socket 42 of bracket 40 over the forward aligned rods 14 in the vehicle and then pressing downwardly on the rear of the console such that socket 52 bracket 50 engages the rearward mounting rod 14 and the generally L-shaped locking lever 54 snap-locks over the rod for securing the console to the vehicle floor. The L-shaped locking lever 54 can be pivoted rearwardly to a releasing position as shown in phantom in FIG. 3 to allow the rear of the console to be tilted upwardly and disengage the rear-mounting rod 14 whereupon the console can be pulled rearwardly to disengage the forward end for removal of the console.

The console 10 includes a storage tray 44 extending downwardly near its rearward end and a sunglass storage area 46 in the intermediate area of the upper portion of the console. The forward end 26 includes container holders 25 and 27 at opposite corners to allow the vehicle occupants to store cans or cups therein for convenient access, particularly where the console is mounted to a center removable seat location. In the preferred embodiment of the invention, the console 10 also includes an electronic entertainment center such as a D.C. operated LCD television receiver 60 which can be mounted to the forward end 26 of the console using a clamping member 62. Member 62 as best seen in FIG. 3, includes a lower jaw 64 which curls around and engages the lower edge of member 26 and an upper jaw 66 which underlies and engages a recess 23 in forward member 26 to hold the television receiver 60 in an upright viewing position as illustrated in the Figures. The receiver may include an internal antenna (not extended) and a power cord 67 which can be plugged into the vehicle cigarette lighter for providing operating power for the receiver. Further, the receiver may include an integrated 8 millimeter video tape player for the playing of movies or the like.

Underlying the open frame defined by legs 30 and 32 on opposites sides of the base 10 is a slide-out storage tray or bin 70 which may include handles 72 and 74 at opposite ends for access from the front or rear areas of the console. A second storage bin 80 may be positioned below storage bin 70 and suitably guided or otherwise supported by, for example, a detent 83 formed in the bin floor which engages an upwardly extending projection 84 in the cross member 36 of base 34 of the console. Thus, the console 10 provides a relatively large storage volume including the tray 44 which may be useful for storing items such as earphones which can be used in connection with the electronic entertainment device 60 and which may be selectively covered if desired by a cover 90 (FIGS. 3 and 4) which also provides sufficient volume of storage for the removable electronic device 60 to be placed thereunder when not is use.

The entire console frame 20 and its integral base 34 can be molded as a single piece of a suitable polymeric material such as polycarbonate which has sufficient strength and rigidity to withstand the weight of a variety of articles stored therein and which will suitably support the mounting brackets 40 and 50 attached to the corners of the base 32. The storage bins 70 and 80 may be molded of a polymeric material such as polyvinylchloride or the like. The frame includes openings 33 at both sides defining the front and rear legs 30 and 32 respectively and also reducing the overall weight and cost of the console. The framework is open at the forward and rearward ends to allow access to the storage bins 70 and 80 from either end. For slidably supporting storage bin 70, the inner sides of legs 30 and 32 include a support tract 31 on either side such that the bins can be easily slid in and out of the stored area's position shown in the Figures for access and also can be removed if desired. Suitable detents are provided in the tract such that the storage bin 70 will remain in position once lifted and placed in a desired use or storage position.

The console can accommodate a variety of other electronic entertainment devices such as tape or audio disc players which can include mounting brackets 62 similar to that associated with the television receiver 60. Such devices can be conveniently stored in either one of the storage bins 70 and 80 when not in use and provide younger travelers significant non-distractive entertainment in the rear seating areas of vehicles such as vans and mini-vans during long trips. It will become apparent to those skilled in the art that the various modifications to the preferred embodiment of the invention as described herein can be made without departing from the spirit or scope thereof as defined by the appended claims.

The embodiments of the invention in which an exclusive property or privilege is claimed are defined as follows.

1. A removable floor-mounted console and vehicle seat attachment structure comprising:
   a seat attachment structure for mounting to the floor of a vehicle for the removable attachment of a vehicle seat thereto;
   a frame having an upper segment defining at least one storage receptacle and downwardly depending legs terminating in a base; and
   said base including means for removably attaching said frame to said vehicle mounted seat attachment structure when a correspondingly located vehicle seat has been removed therefrom.

2. The console as defined in claim 1 wherein said means for removably attaching said base to said seat attachment structure includes latch means for lockably attaching said console to the vehicle. attaching said console to the vehicle.

3. The console as defined in claim 2 wherein said upper segment includes container holding recesses for receiving containers therein.

4. The console as defined in claim 3 wherein said frame includes open and front access areas under said upper segment and above said base and wherein said upper segment includes guide means for receiving a slide-out storage bin.

5. The console as defined in claim 1 and further including an electronic entertainment device mounted to said upper segment of said frame.

6. The console as defined in claim 5 wherein said frame includes an open area under said upper segment and above said base for receiving a storage bin.

7. The console as defined in claim 6 wherein said upper segment includes guide means for slidably receiving a storage bin and further including a storage bin slidable mounted to said guide means.

8. A console and vehicle seat attachment structure for removably attaching said console to a vehicle when a removable seat has been removed therefrom comprising:
   a seat attachment structure for mounting to the floor of a vehicle for the removable attachment of a vehicle seat thereto;
   a mounting base having means for removably attaching said base to said seat attachment structure mounted on the floor of a vehicle;
   a plurality of legs extending upwardly from said base; and
   a storage tray supported above said base by said legs.

9. The console as defined in claim 8 wherein said storage tray is defined by a rim extending around and supported by said legs and further including a mounting bracket attached to said rim for holding a vehicle accessory to said rim.

10. The console as defined in claim 9 wherein said vehicle accessory comprises an electronic entertainment device.

11. The console as defined in claim 9 wherein said legs define an open area under said tray and above said base and further including a storage bin mounted in said open area.

12. The console as defined in claim 11 wherein said storage bin is slidably mounted under said tray.

13. The console as defined in claim 12 and further including a second storage bin removably mounted to said base under said first named storage bin.

14. The console and attached structure as defined in claim 8 wherein said storage tray includes at least one container holder therein.

15. A console and attached structure for a vehicle comprising:
   a support base;
   mounting brackets attached to said support base for removably mounting said base to the floor of a vehicle using existing seat mounting hardware in the vehicle;
   a support rim coupled in spaced relationship above said base for supporting an electronic entertainment device thereon; and
   an electronic entertainment device mounted to said rim.

16. The console as defined in claim 15 wherein said entertainment device comprises a television receiver.

17. The console as defined in claim 16 and further including a storage tray integrally formed with said support rim for storing items therein.

18. A console and attached structure for a vehicle comprising:
   a support base;
   mounting brackets attached to said support base for removably mounting said base to the floor of a vehicle using existing seat mounting hardware in the vehicle;
   a support rim coupled in spaced relationship above said base; and
   a storage tray coupled to said support rim for storing articles therein.

19. The console as defined in claim 18 wherein said storage tray is integrally formed with said rim.

20. The console as defined in claim 19 and further including a removable storage bin slidably mounted to the underside of said rim.

21. The console as defined in claim 20 and further including a container holder mounted to said rim.

* * * * *

UNITED STATES PATENT AND TRADEMARK OFFICE
CERTIFICATE OF CORRECTION

PATENT NO. : 5,338,081
DATED : August 16, 1994
INVENTOR(S) : Nathan W. Young et al.

It is certified that error appears in the above-indentified patent and that said Letters Patent is hereby corrected as shown below:

Column 5, Claim 15, line 5
  "and attached structure" should be --and attachment
   structure--; and Column 6, Claim 18, line 4
  "and attached structure" should be --and attachment
   structure--.

Signed and Sealed this

Ninth Day of May, 1995

Attest:

BRUCE LEHMAN

Attesting Officer    Commissioner of Patents and Trademarks